(12) United States Patent
Ward

(10) Patent No.: US 9,400,201 B1
(45) Date of Patent: Jul. 26, 2016

(54) RISING WATER ALARMS

(71) Applicant: Aub N. Ward, Ruston, LA (US)

(72) Inventor: Aub N. Ward, Ruston, LA (US)

( * ) Notice: Subject to any disclaimer, the term of this patent is extended or adjusted under 35 U.S.C. 154(b) by 0 days.

(21) Appl. No.: 14/174,100

(22) Filed: Feb. 6, 2014

(51) Int. Cl.
*G08B 21/18* (2006.01)
*G01F 23/26* (2006.01)
*G08B 21/08* (2006.01)

(52) U.S. Cl.
CPC .............. *G01F 23/26* (2013.01); *G08B 21/084* (2013.01); *G08B 21/182* (2013.01)

(58) Field of Classification Search
CPC ....................................................... G01F 23/26
See application file for complete search history.

(56) References Cited

U.S. PATENT DOCUMENTS

| 1,907,320 | A | | 5/1933 | Harper |
| 4,169,261 | A | | 9/1979 | Alpaugh |
| 4,703,652 | A | * | 11/1987 | Itoh et al. ..................... 73/290 V |
| 4,800,372 | A | | 1/1989 | Poteet |
| 4,879,545 | A | | 11/1989 | Aguilar |
| 4,973,947 | A | | 11/1990 | Tax |
| 5,283,569 | A | | 2/1994 | Nelson |
| 5,446,444 | A | * | 8/1995 | Lease ............................ 340/514 |
| 5,781,117 | A | | 7/1998 | Rish |
| 5,850,175 | A | | 12/1998 | Yeilding |
| 5,861,811 | A | * | 1/1999 | Lease et al. ................... 340/618 |
| 6,084,521 | A | | 7/2000 | Ha |
| 6,157,307 | A | | 12/2000 | Hardin |
| 6,169,476 | B1 | | 1/2001 | Flanagan |
| 6,433,560 | B1 | * | 8/2002 | Hansen et al. ................ 324/668 |
| 6,480,113 | B1 | * | 11/2002 | Esposito ....................... 340/624 |
| 6,558,216 | B2 | * | 5/2003 | Yerazunis .............. G01C 13/00 441/11 |
| 7,193,508 | B2 | | 3/2007 | Hill et al. |
| 7,358,855 | B1 | | 4/2008 | Willis |
| 7,492,272 | B1 | | 2/2009 | MacDonald |
| 7,782,199 | B2 | | 8/2010 | Issokson |
| 2006/0005622 | A1 | * | 1/2006 | Burdi et al. .................. 73/304 C |
| 2006/0192679 | A1 | * | 8/2006 | Buckley et al. ............... 340/618 |
| 2006/0220889 | A1 | | 10/2006 | Taverney |
| 2009/0139324 | A1 | * | 6/2009 | Morimoto et al. ............. 73/292 |
| 2014/0352293 | A1 | * | 12/2014 | Quappen ................. F03B 17/06 60/497 |

\* cited by examiner

*Primary Examiner* — Van Trieu
(74) *Attorney, Agent, or Firm* — R. Keith Harrison

(57) ABSTRACT

Rising water alarms include a generally elongated alarm housing having an alarm end and a detection end, an alarm circuit, a source of electrical current connected to the alarm circuit, an audible alarm carried by the alarm end of the alarm housing and electrically connected to the alarm circuit and a pair of spaced-apart sensor contacts carried by the detector end of the alarm housing and electrically connected to the alarm circuit. The sensor contacts activate the alarm circuit upon establishment of electrical contact between the sensor contacts by rising water.

20 Claims, 5 Drawing Sheets

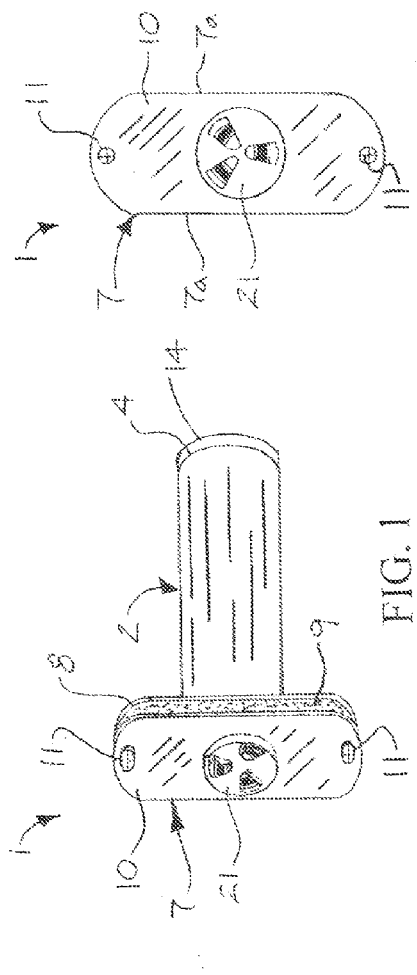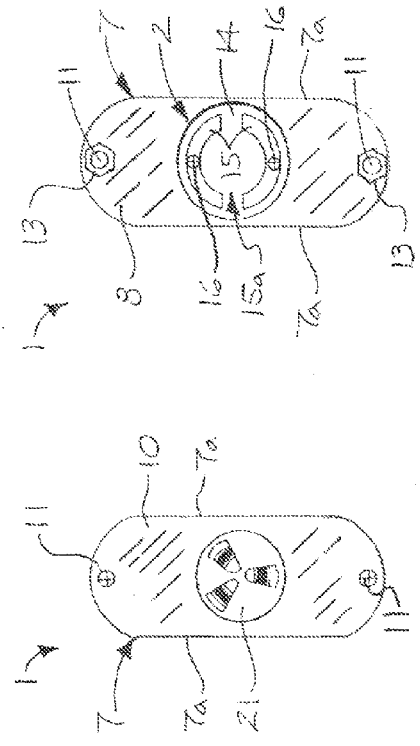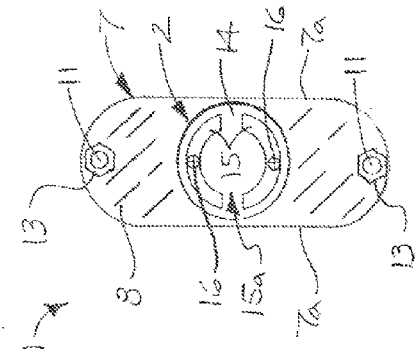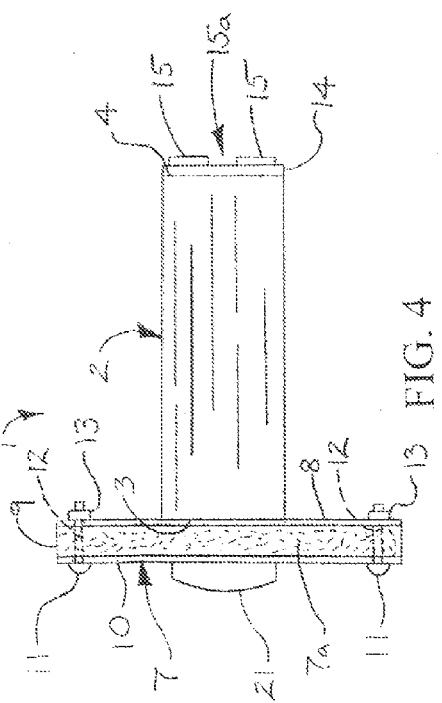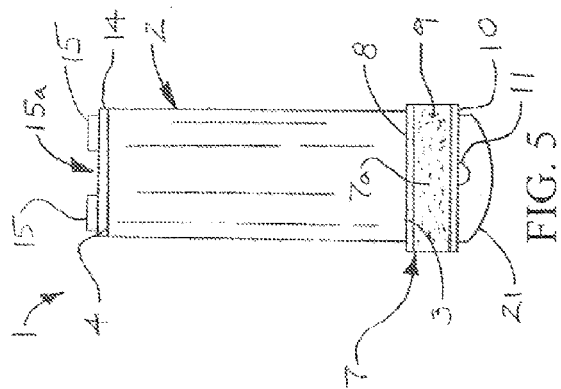

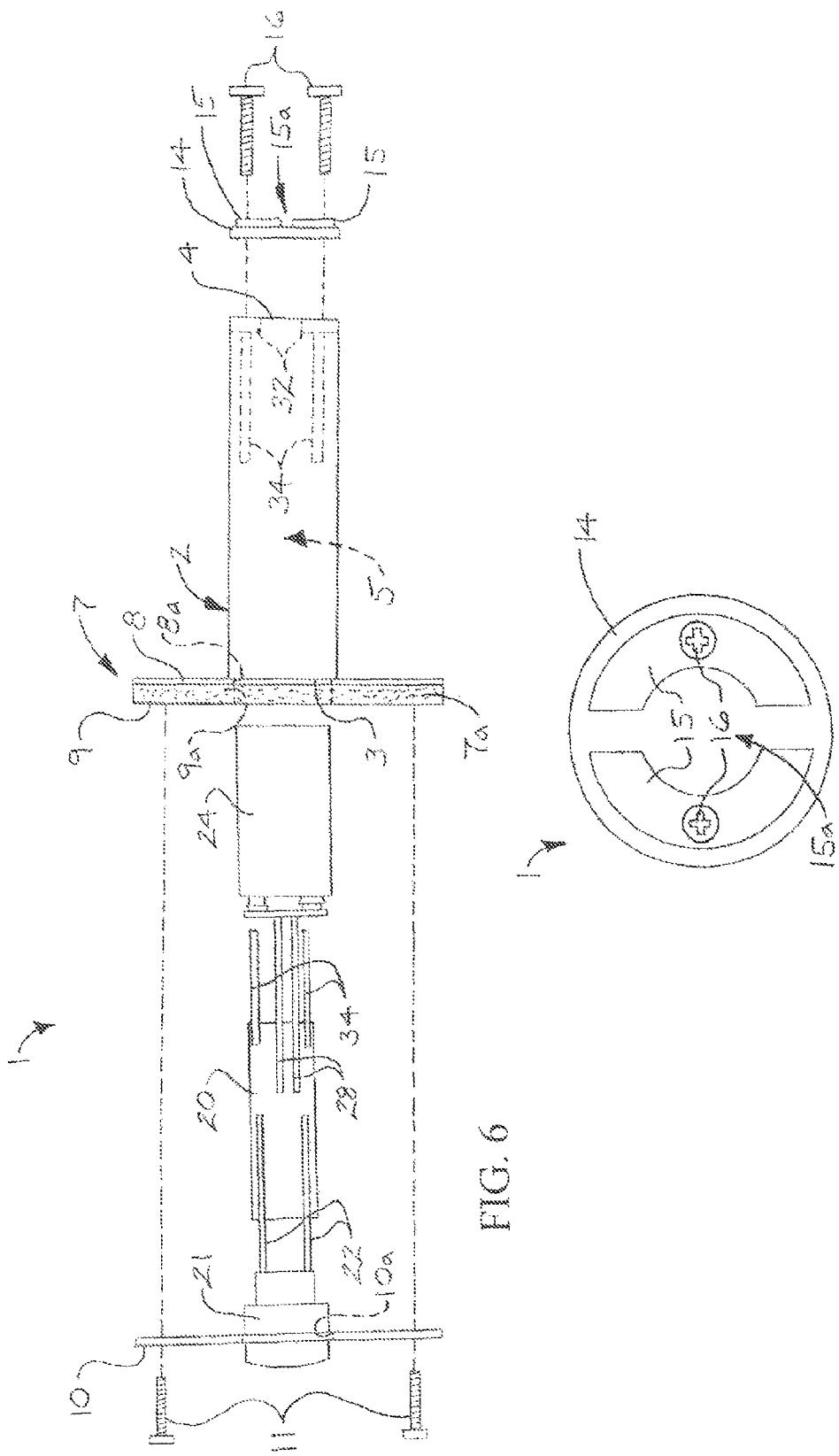

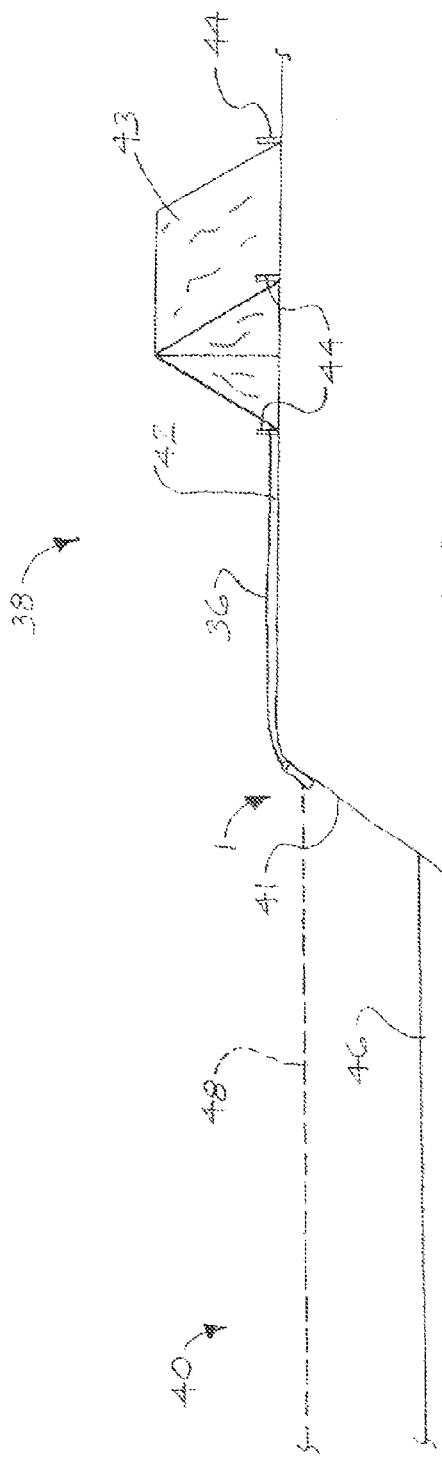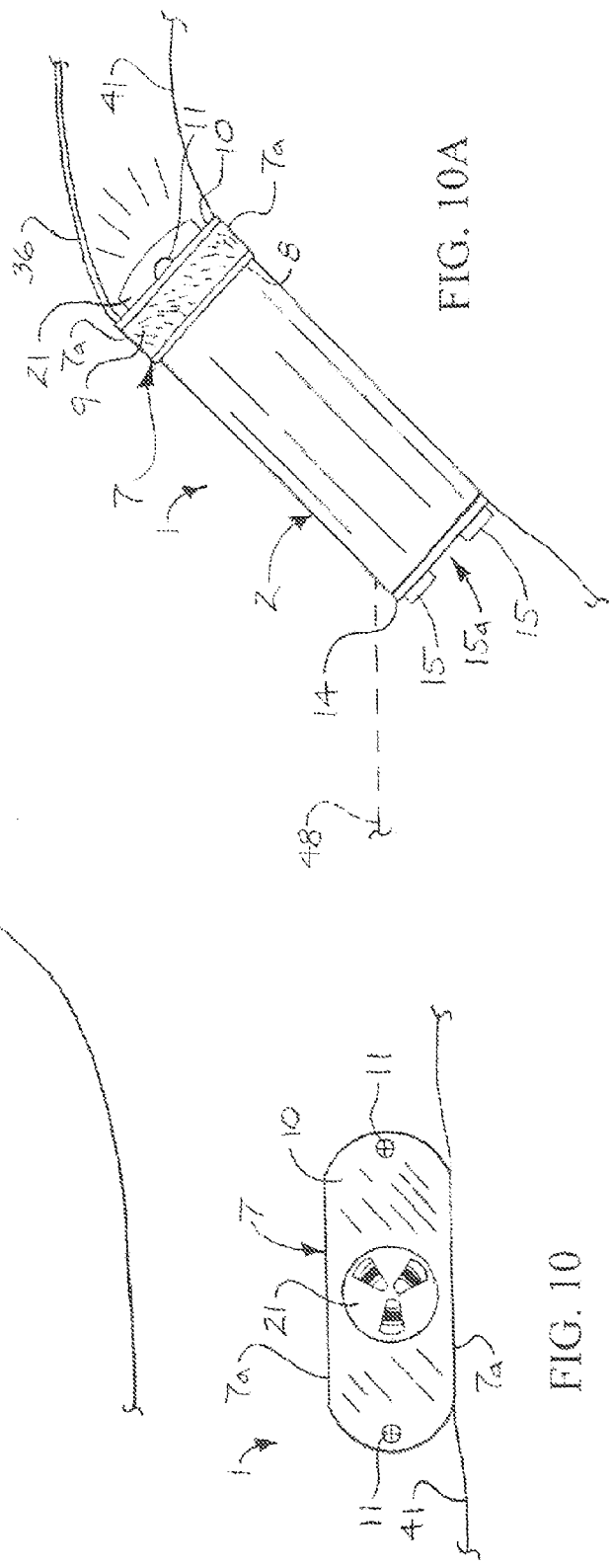

RISING WATER ALARMS

CROSS-REFERENCE TO RELATED APPLICATIONS

This application claims the benefit of U.S. provisional application No. 61/766,929, filed Feb. 20, 2013 and entitled RISING WATER ALARMS, which provisional application is hereby incorporated by reference herein in its entirety.

FIELD

Illustrative embodiments of the disclosure generally relate to alarms which indicate the presence of water. More particularly, illustrative embodiments of the disclosure relate to rising water alarms which are suitable for alerting campers to the potential encroachment of rising water from a lake, river or like body of water near a campsite.

BACKGROUND

Camping is a popular pastime around the world and is often accompanied by outdoor activities such as hiking, hunting and fishing. Therefore, many campers enjoy sleeping in tents which are deployed near a lake, river or other body of water. However, flash floods and thunderstorms accompanied by heavy rains can appear with little or no warning, particularly at night, and raise the level of water in the water body to flood levels while the campers are asleep. The rising waters may encroach upon the campsite and potentially endanger the campers.

Therefore, rising water alarms which are suitable for alerting campers to the potential encroachment of rising water from a lake, river or like body of water near a campsite are needed.

SUMMARY

Illustrative embodiments of the disclosure are directed to rising water alarms which are suitable for alerting campers to the potential encroachment of rising water from a lake, river or like body of water near a campsite. An illustrative embodiment of the rising water alarms includes a generally elongated alarm housing having an alarm end and a detection end, an alarm circuit, a source of electrical current connected to the alarm circuit, an audible alarm carried by the alarm end or the alarm housing and electrically connected to the alarm circuit and a pair of spaced-apart sensor contacts carried by the detector end of the alarm housing and electrically connected to the alarm circuit. The sensor contacts activate the alarm circuit upon establishment of electrical contact between the sensor contacts by rising water

BRIEF DESCRIPTION OF THE DRAWINGS

Illustrative embodiments will now be described, by way of example, with reference to the accompanying drawings, in which:

FIG. 1 is a front perspective view or an illustrative embodiment of the rising water alarms;

FIG. 2 is a front view of the illustrative rising water alarm illustrated in FIG. 1;

FIG. 3 is a rear view of the illustrative rising water alarm;

FIG. 4 is a top view of the illustrative rising water alarm;

FIG. 5 is a side view of the illustrative rising water alarm;

FIG. 6 is an exploded top view of the illustrative rising water alarm;

FIG. 7 is a rear view of the illustrative rising water alarm, more particularly illustrating an exemplary housing cap;

FIG. 9 is a perspective view which illustrates an exemplary camping application in which the illustrative rising water alarm is deployed on a bank of a water body to alert occupants of a campsite to rising water in the water body;

FIG. 10 is a front view of the illustrative rising water alarm deployed on the bank of the water body;

FIG. 10A is a side view of the illustrative rising water alarm deployed on the bank of the water body;

DETAILED DESCRIPTION

Figure 8:
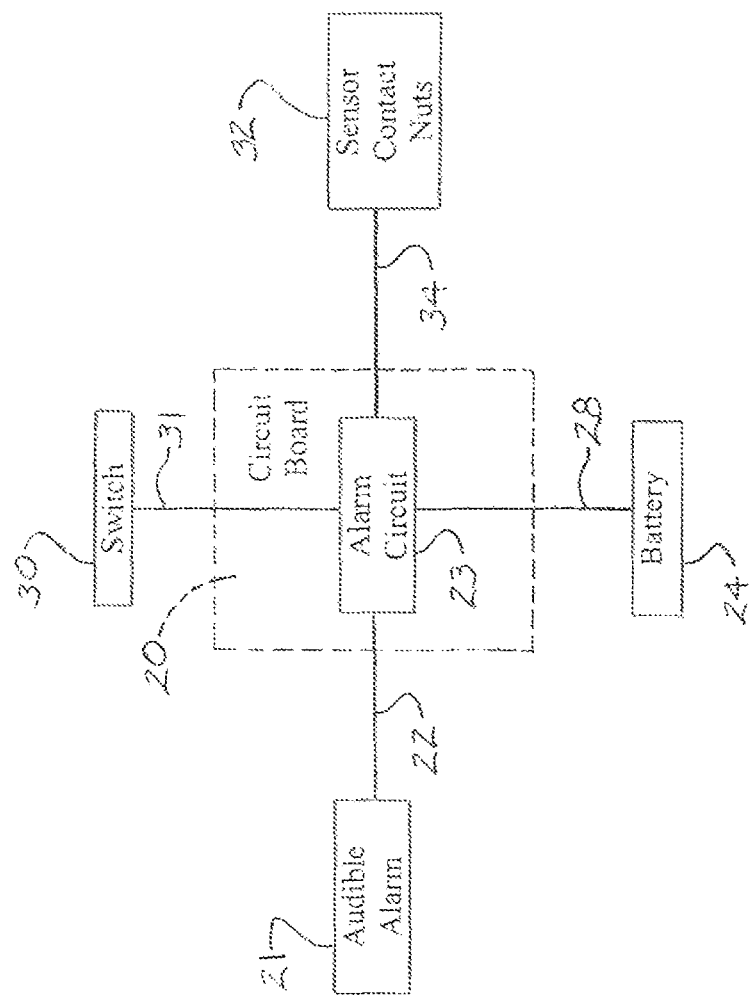
FIG. 8 is a block diagram of a circuit board and exemplary functional components of the illustrative rising water alarm connected to the circuit board.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Referring initially to FIG. 9 of the drawings, an illustrative embodiment of the rising water alarm is generally indicated by reference numeral 1. As will be hereinafter further described, in exemplary application, the rising water alarm 1 is placed on a bank 41 of a water body 40 such as a lake or river, for example and without limitation, to audibly warn occupants at a campsite 38 of rising water in the water body 40. The rising water in the water body 40 may be caused by a thunderstorm or flash flood which strikes during the night when the occupants of the campsite 38 are asleep and least alert. Accordingly, the rising water alarm 1 enables the occupants of the campsite 38 to awaken and leave the campsite 38 or take other evasive measures to avoid dangers posed by encroachment of the rising water from the water body 40 upon the campsite 38.

Referring next to FIGS. 1-8 of the drawings, the rising water alarm 1 includes an alarm housing 2. In some embodiments, the alarm housing 2 may be generally elongated and cylindrical with an alarm end 3 and a detector end 4, as illustrated in FIG. 4. The alarm housing 2 has a housing interior 5 (FIG. 6).

A seal assembly 7 may be provided at the alarm end 3 of the alarm housing 2. The seal assembly 7 may include a seal flange 8 which terminates the alarm end 3. A seal flange alarm opening 8a (FIG. 6) extends through the seal flange 8. A seal plate 10 may be disposed in generally parallel, spaced-apart relationship to the seal flange 8. The seal plate 10 has a seal plate alarm opening 10a (FIG. 6) which registers with the seal flange alarm opening 8a of the seal flange 8. A seal 9 may be sandwiched between the seal flange 8 and the seal plate 10. The seal 9 may be foam, foam rubber and/or other suitable resilient and buoyant material which is consistent with the water sealing requirements of the seal 9. A seal alarm opening 9a extends through the seal 9 and registers with the seal flange alarm opening 8a of the seal flange 8 and the seal plate alarm opening 10a of the seal plate 10. An audible alarm 21 extends through the registering seal flange alarm opening 8a, the seal alarm opening 9a and the seal plate alarm opening 10a.

The seal plate 10 may be generally the same or similar in size and shape to the seal flange 8. The seal 9 may be generally the same or similar in size and shape to the seal flange 8 and the seal plate 10. Accordingly, in some embodiments, the seal flange 8, the seal 9 and the seal plate 10 may be generally elongated and oval or elliptical in shape, as illustrated. Therefore, the seal assembly 7 may have a pair of elongated, parallel, flat or planar seal assembly surfaces 7a.

As illustrated in FIG. 4, in some embodiments, two sets of registering fastener openings 12 may extend through the seal flange 8, the seal 9 and the seal plate 10, respectively, of the seal assembly 7. A seal plate fastener 11 may extend through each set of registering fastener openings 12. A securing nut 13 may be threaded on each seal plate fastener 11 and tightened against the seal flange 8. The seal plate fasteners 11 and securing nuts 13 may compress the seal 9 between the seal flange 8 and the seal plate 10, forming a liquid-tight seal between the exterior and the housing interior (FIG. 6) of the alarm housing 2. In other embodiments, the seal 9 may be secured to the seal flange 8 and the seal plate 10 may be secured to the seal 9 using a suitable adhesive.

A housing cap 14 may be provided on the detection end 4 of the alarm housing 2. A pair of spaced-apart sensor contacts 15 is provided on the housing cap 14. Each sensor contact 15 may be an electrically conductive metal or material such as copper, brass or bronze, for example and without limitation. In some embodiments, each sensor contact 15 may have a generally semicircular shape, as illustrated in FIG. 7. A sensor contact gap 15a may separate the sensor contacts 15. A pair of cap fasteners 16 extends through a respective pair of cap fastener openings (not illustrated) in the housing cap 14. The cap fasteners 16 may be threaded through a registering pair of spaced-apart sensor contact nuts 32 (FIG. 6) in the housing interior 5 and at the detection end 4 of the alarm housing 2 to detachably secure the housing cap 14 on the alarm housing 2.

As illustrated in FIG. 6, a circuit board 20 may be contained in the housing interior 5 of the alarm housing 2. As illustrated in FIG. 8, an alarm circuit 23 may be provided on the circuit board 20. The sensor contact nuts 32 in the housing interior 5 at the detection end 4 of the alarm housing 2 may be electrically connected to the alarm circuit 23 such as via sensor contact wiring 34. The audible alarm 21 may be electrically connected to the alarm circuit 23 such as via alarm wiring 22. At least one battery 24 may be electrically connected to the alarm circuit 23 such as via battery wiring 28. Accordingly, the sensor contact gap 15a between the sensor contacts 15 normally opens an electrical circuit between the alarm circuit 23, the battery 24 and the audible alarm 21. In the event that the sensor contacts 15 on the housing cap 14 are submerged in water, the submerging water closes the sensor contact gap 15a between the sensor contacts 15 and energizes the alarm circuit 23. Electrical current thus flows from the battery 24 through the alarm circuit 23, which energizes and activates the audible alarm 21.

As further illustrated in FIG. 8, in some embodiments, a switch 30 may be electrically connected to the alarm circuit 23 such as via switch wiring 31. The switch 30 may be adapted to selectively and reversibly establish electrical current from the battery 24 to the alarm circuit 23 in the event that electrical contact between the sensor contacts 15 is established.

Referring next to FIGS. 9, 10 and 10A of the drawings, in exemplary application, the rising water alarm 1 is placed on a bank 41 of a water body 40 such as a lake or river, for example and without limitation, in the vicinity of a campsite 38 adjacent to the water body 40. As illustrated in FIG. 10, the rising water alarm 1 may be placed on the bank 41 with one of the flat seal assembly surfaces 7a resting on the bank 41, such that the seal plate 10 is oriented in a horizontal position. As illustrated in FIG. 10A, the rising water alarm 1 is positioned such that the sensor contacts 15 on the housing cap 14 are oriented toward the water 46 in the water body 40. The audible alarm 21 of the rising water alarm 1 is oriented toward one or more tents 43 which are deployed on the ground 42 adjacent to the water body 40 and contain one or more occupants. As illustrated in FIG. 9, in some embodiments, a tether 36 may attach the rising water alarm 1 to a tent stake 44 or other structure outside or inside the tent 43. The tether 36 may be attached to the seal assembly 7 or any other suitable component of the rising water alarm 1 by extending the tether through a tether opening (not illustrated) in the seal assembly 7.

In the event that the water 46 in the water body 40 rises to an elevated water level 48 which corresponds to the position of the rising water alarm 1 on the bank 41, the sensor contacts 15 on the housing cap 14 of the rising water alarm 1 are submerged in the water 46, which closes the sensor contact gap 15a between the sensor contacts 15 and energizes the alarm circuit 23. Accordingly, the alarm circuit 23 energizes the audible alarm 21, which audibly warns occupants of the tent or tents 43 at the campsite 38 of the rising water in the water body 40. Therefore, the rising water alarm 1 enables the occupants of the campsite 38 to awaken and leave the campsite 38 or take other evasive measures to avoid the dangers posed by the water rising in the water body 40 and potentially encroaching on the campsite 38. The rising water alarm 1 can be removed from the rising water 46 in the water body 40 by pulling the tether 36.

It will be appreciated by those skilled in the art that the seal 9 imparts a fluid-tight seal between the exterior of the rising water alarm 1 and the housing interior 5 (FIG. 6) of the alarm housing 2. Additionally, the seal 9 imparts buoyancy to the rising water alarm 1 and prevents the rising water alarm 1 from becoming submerged in the rising water 46. Moreover, the tether 36 prevents the rising water alarm 1 from being moved outside the effective radius of the audible alarm 21 by flood water, animals and/or other influences.

In the event that the battery 24 requires replacement after use of the rising water alarm 1, the housing cap 14 can be removed from the detection end 4 of the alarm housing 2 and the battery 24 detached from the circuit board 20. A replacement battery 24 may then be attached to the circuit board 20 and placed in the housing interior 5 and the housing cap 14 reattached to the alarm housing 2.

Figure 12:
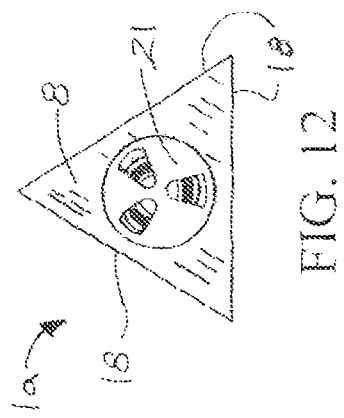
FIG. 12 is a front view of the illustrative rising water alarm illustrated in FIG. 11.
Figure 11:
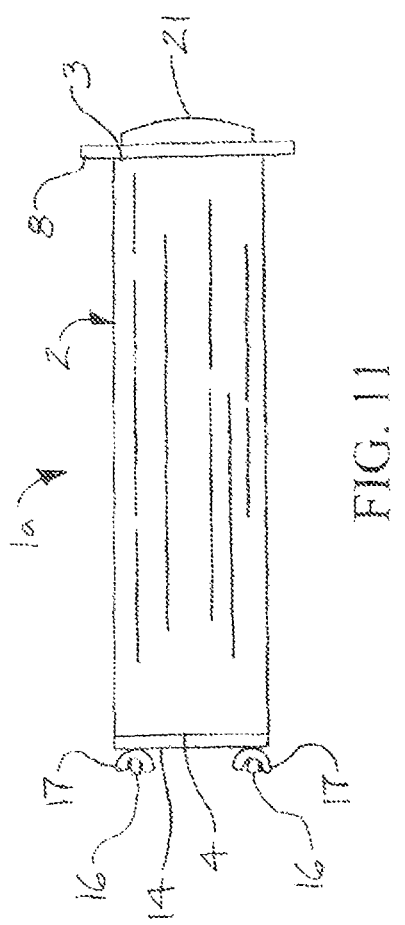
FIG. 11 is a side view of an alternative illustrative embodiment of the rising water alarms.
Figure 13:
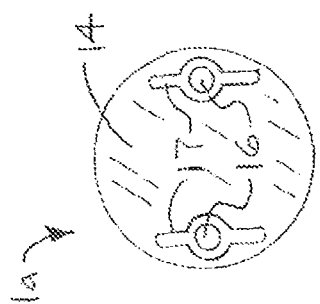
FIG. 13 is a rear view of the illustrative rising water alarm illustrated in FIG. 11.

Referring next to FIGS. 11-13 of the drawings, an alternative illustrative embodiment of the rising water alarm is generally indicated by reference numeral 1a. The rising water alarm 1a may include an alarm housing 2 having an alarm end 3 and a detection end 4. A housing cap 14 may be detachably secured to the detection end 4 by threading a pair of wing nuts 17 on a pair of cap fasteners 16, respectively. The cap fasteners 16 are electrically connected to an alarm circuit 23 (FIG. 8). A seal flange 8 is provided on the alarm end 3 of the alarm housing 2. As illustrated in FIG. 12, the seal flange 8 may be generally triangular in shape with multiple flat flange edges 18.

Application of the rising water alarm 1a may be as was heretofore described with respect to the rising water alarm 1 in FIGS. 9-10A. The rising water alarm 1a may be rested on one of the flat flange edges 18 of the triangular seal flange 8, which stabilizes the rising water alarm 1a on the ground 42 (FIG. 9). The rising water 46 contacts the wing nuts 17 on the respective cap fasteners 16, completing the alarm circuit 23 (FIG. 8) which activates the audible alarm 21.

While illustrative embodiments of the disclosure have been described above, it will be recognized and understood that various modifications can be made and the appended claims are intended to cover all such modifications which may fall within the spirit and scope of the disclosure.

What is claimed is:

1. A rising water alarm, comprising:
    a generally elongated alarm housing having an alarm end and a detection end;
    an alarm circuit;
    a source of electrical current connected to the alarm circuit;
    an audible alarm carried by the alarm end of the alarm housing and electrically connected to the alarm circuit;
    a pair of spaced-apart sensor contacts carried by the detector end of the alarm housing and electrically connected to the alarm circuit, the sensor contacts activate the alarm circuit upon establishment of electrical contact between the sensor contacts by rising water;
    at least one flange carried by the alarm end of the alarm housing and protruding outwardly beyond an exterior surface of the alarm housing, the at least one flange configured to support the alarm housing in a stable position on the ground; and
    a tether attached to the alarm housing, the tether configured to remain intact during rising water and prevent the alarm housing from being moved outside an effective radius of the audible alarm by flood water, animals and other influences.

2. The rising water alarm of claim 1 further comprising a seal assembly carried by the alarm end of the alarm housing and wherein the audible alarm is carried by the seal assembly.

3. The rising water alarm of claim 2 wherein the seal assembly has at least one flat or planar seal assembly surface.

4. The rising water alarm of claim 2 wherein the seal assembly comprises a seal assembly flange carried by the alarm end of the alarm housing, a seal engaging the seal assembly flange and a seal plate engaging the seal.

5. The rising water alarm of claim 1 further comprising a housing cap detachably engaging the detection end of the alarm housing and wherein the sensor contacts are carried by the housing cap.

6. The rising water alarm of claim 5 further comprising a pair of sensor contact nuts carried by the alarm housing and disposed in electrical contact with the alarm circuit and a pair of cap fasteners engaging the sensor contacts, respectively, and the sensor contact nuts, respectively.

7. The rising water alarm of claim 1 wherein each of the sensor contacts is semicircular.

8. The rising water alarm of claim 1 further comprising a switch interfacing with the alarm circuit, the switch adapted to inactivate the alarm circuit.

9. A rising water alarm, comprising:
    a generally elongated alarm housing having an alarm end and a detection end;
    an alarm circuit;
    a source of electrical current connected to the alarm circuit;
    an audible alarm carried by the alarm end of the alarm housing and electrically connected to the alarm circuit;
    a pair of spaced-apart sensor contacts carried by the detector end of the alarm housing and electrically connected to the alarm circuit, the sensor contacts activate the alarm circuit upon establishment of electrical contact between the sensor contacts by rising water; and
    a tether attached to the alarm housing, the tether configured to remain intact during rising water and prevent the alarm housing from being moved outside an effective radius of the audible alarm by flood water, animals and other influences.

10. The rising water alarm of claim 9 further comprising a seal assembly carried by the alarm end of the alarm housing and wherein the audible alarm is carried by the seal assembly.

11. The rising water alarm of claim 10 wherein the seal assembly has at least one flat or planar seal assembly surface.

12. The rising water alarm of claim 10 wherein the seal assembly comprises a seal assembly flange carried by the alarm end of the alarm housing, a seal engaging the seal assembly flange and a seal plate engaging the seal.

13. The rising water alarm of claim 9 further comprising a housing cap detachably engaging the detection end of the alarm housing and wherein the sensor contacts are carried by the housing cap.

14. The rising water alarm of claim 13 further comprising a pair of sensor contact nuts carried by the alarm housing and disposed in electrical contact with the alarm circuit and a pair of cap fasteners engaging the sensor contacts, respectively, and the sensor contact nuts, respectively.

15. The rising water alarm of claim 9 wherein each of the sensor contacts is semicircular.

16. The rising water alarm of claim 9 further comprising a switch interfacing with the alarm circuit, the switch adapted to inactivate the alarm circuit.

17. A rising water alarm, comprising:
    a generally elongated alarm housing having an alarm end and a detection end;
    an elongated and oval or elliptical seal assembly carried by the alarm end of the alarm housing, the seal assembly having a seal assembly flange carried by the alarm end of the alarm housing and protruding outwardly beyond an exterior surface of the alarm housing, a seal engaging the seal assembly flange, a seal plate engaging the seal and a pair of elongated, parallel, flat or planar seal assembly surfaces configured to support the alarm housing in a stable position on the ground;
    a housing cap detachably engaging the detection end of the alarm housing;
    an alarm circuit;
    a source of electrical current connected to the alarm circuit;
    an audible alarm carried by the seal plate of the seal assembly and electrically connected to the alarm circuit;
    a pair of spaced-apart sensor contacts carried by the housing cap and electrically connected to the alarm circuit, the sensor contacts activate the alarm circuit upon establishment of electrical contact between the sensor contacts by rising water;
    a sensor contact gap between the sensor contacts; and
    a tether attached to the alarm housing, the tether configured to remain intact during rising water and prevent the alarm housing from being moved outside an effective radius of the audible alarm by flood water, animals and other influences.

18. The rising water alarm of claim 17 further comprising a pair of sensor contact nuts carried by the alarm housing and disposed in electrical contact with the alarm circuit and a pair of cap fasteners engaging the sensor contacts, respectively, and the sensor contact nuts, respectively.

19. The rising water alarm of claim 17 wherein each of the sensor contacts is semicircular.

20. The rising water alarm of claim 17 further comprising a switch interfacing with the alarm circuit, the switch adapted to inactivate the alarm circuit.

\* \* \* \* \*